Figure 1:
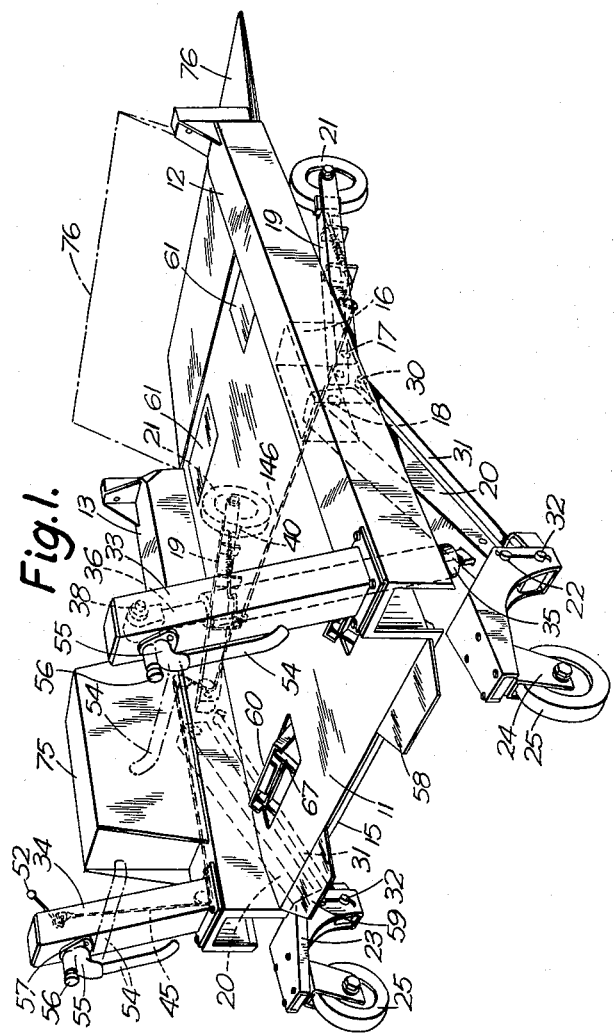

Feb. 8, 1966   R. GOODACRE   3,233,767
LOAD LIFTING TROLLEYS

Filed Aug. 4, 1964   4 Sheets-Sheet 1

Feb. 8, 1966   R. GOODACRE   3,233,767
LOAD LIFTING TROLLEYS
Filed Aug. 4, 1964   4 Sheets-Sheet 2
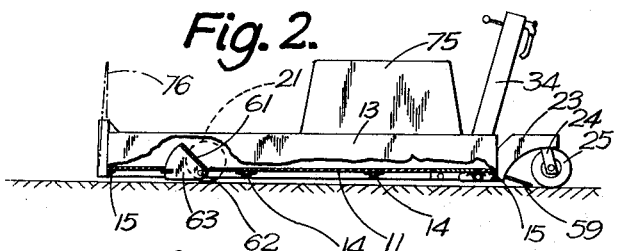
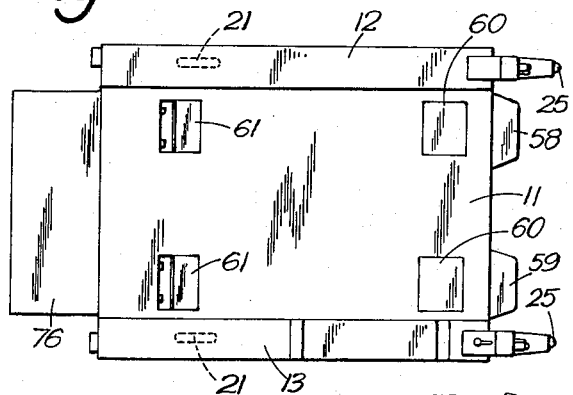
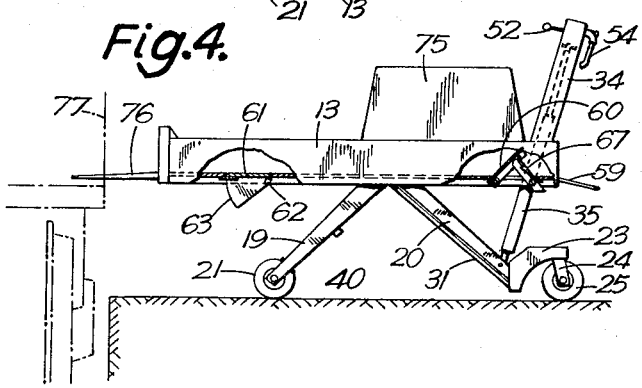

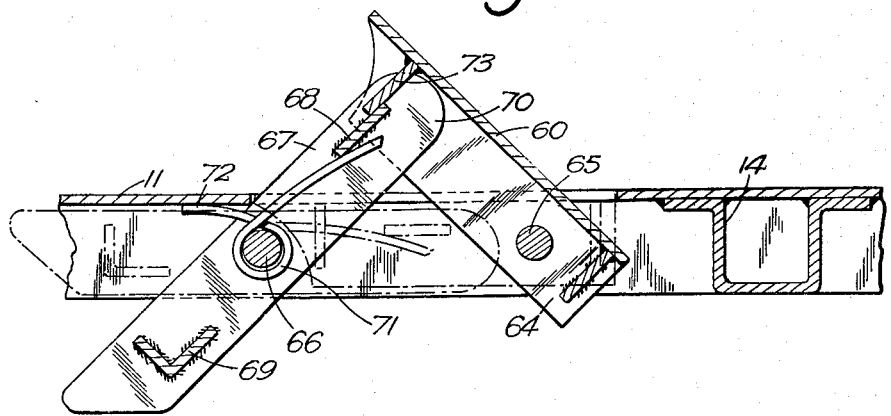

Feb. 8, 1966   R. GOODACRE   3,233,767
LOAD LIFTING TROLLEYS

Filed Aug. 4, 1964   4 Sheets-Sheet 4

United States Patent Office 3,233,767
Patented Feb. 8, 1966

1

3,233,767
LOAD LIFTING TROLLEYS
Ronald Goodacre, Basingstoke, England, assignor to Lansing Bagnall Limited, Basingstoke, England, a British company
Filed Aug. 4, 1964, Ser. No. 387,295
Claims priority, application Great Britain, Aug. 7, 1963, 31,196/63
8 Claims. (Cl. 214—512)

This invention comprises improvements in or relating to load lifting trolleys.

When goods have to be transferred from a railway station platform to rail vehicles or vice versa or otherwise handled into or out of vehicles, problems arise owing to the necessity of allowing for varying heights of the vehicle floors and this is particularly the case when covered vehicles such as vans are in question because goods cannot be lifted by a crane or the like into or out of a van. It is common practice to move goods about on hand trolleys and on pallet trucks, but these vehicles are not capable of travelling from one surface to another where there is a sudden rise or fall in surface level. The use of ramps is only a partial solution because ramps take time and labour to put in place. It is an object of the present invention to deal with this situation.

A further difficulty is that trolleys and pallet trucks, being wheeled, have to be kept under control and a simple bridge plate, which is a kind of ramp, large enough to receive a truck, is difficult to handle and when in use will have a slope on which the truck will tend to run away. Also when it is desired to load manually-propelled trolleys or trucks, the gradient of a sloping ramp may be too great for a trolley to be pushed up it.

The present invention comprises a bridge-plate for facilitating transfer of goods from a surface at one level to a surface at another, to which bridge-plate wheel-carrying members are secured having wheels which are adjustable for height relatively to the bridge-plate.

The wheel-carrying members may be arms extending fore-and-aft along the sides of the bridge-plate, pivoted to the bridge-plate at one end and carrying wheel axles for the wheels at the other. In this case the height adjustment can be effected by swinging the arms up or down.

The arms may be pivoted to brackets on the underside of the bridge-plate near the centre and extend away from one another towards its ends, so that the wheels are located near the ends of the bridge-plate, which gives it stable support, and they may be interlinked so that they move in unison and this enables the plate to be raised or lowered while maintaining it substantially horizontal. In this way a pallet truck or trolley may be run on to the bridge-plate at one level, say from a station platform, it may then be adjusted to another level, say one corresponding to that of a floor of a railway van, and the bridge-plate may then be wheeled to the van and the pallet truck or trolley used to take the load inside the van.

To facilitate manoeuvre of the apparatus the wheels at one end may be castor mountings.

There may, moreovver, be handle-means for controlling its movement and in one form the handle-means hinge down when not in use so as to be out of the way. A ramp device may be provided which will assist pallet trucks or trolleys to pass on to the bridge-plate when it is lowered close to the ground. There may also be provided a hinged ramp at the opposite end of the bridge-plate from the first ramp.

The height adjustment may be power-operated by hydraulic or screw-actuated lifting devices or alternatively the height adjustment may be actuated by manual means.

A bridge-plate according to the present invention has been found particularly useful for facilitating the loading of trolleys of the type described in the specification of United States application No. 373,705.

Figure 6:
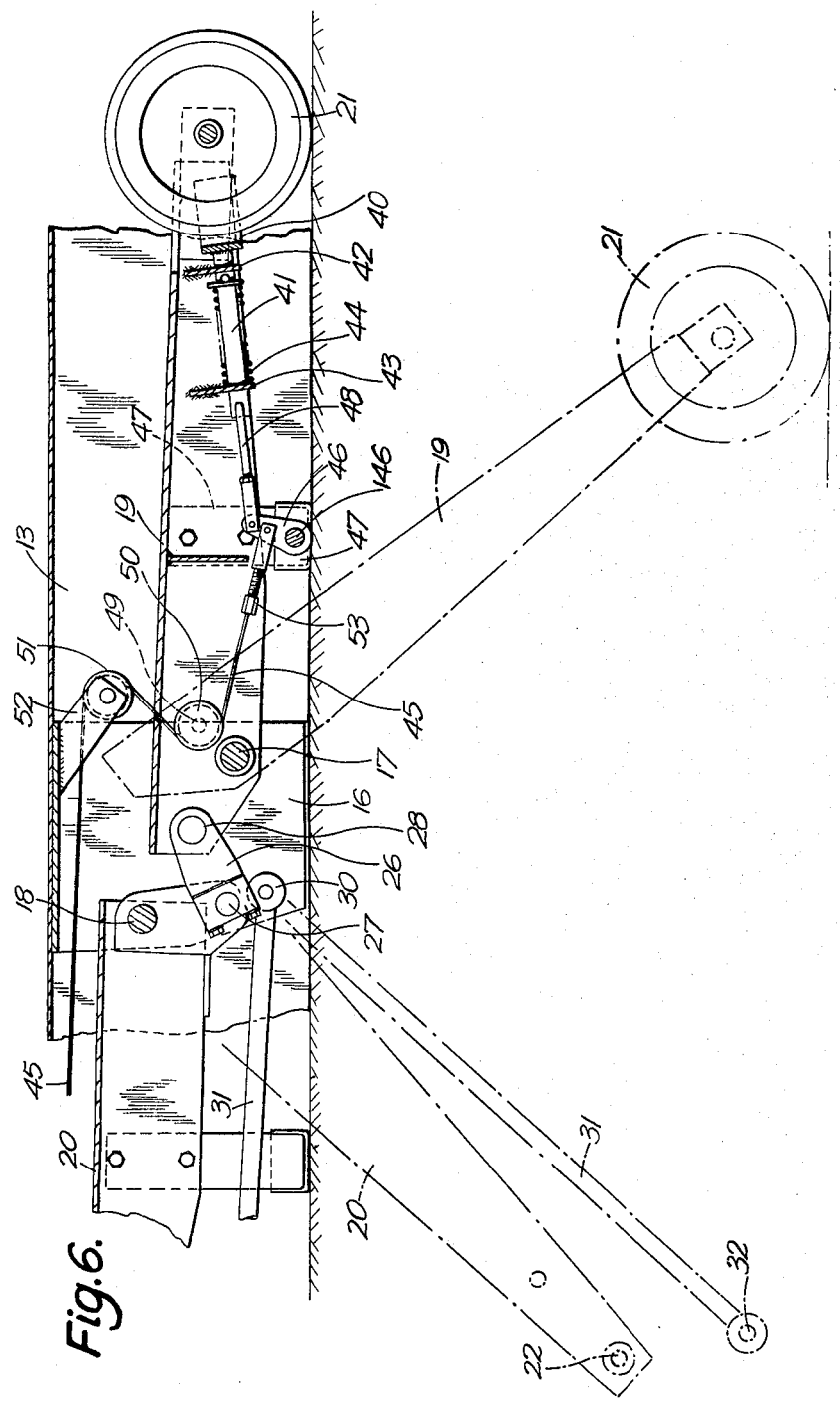

The following is a description, by way of example, of a construction in accordance with the invention:

Referring to the accompanying drawings:
FIGURE 1 is a perspective view of a device according to the present invention;
FIGURE 2 is a side elevation to a smaller scale;
FIGURE 3 is a plan;
FIGURE 4 is a side elevation showing the bridge-plate elevated;
FIGURE 5 is a section through a floor stop, and
FIGURE 6 is a longitudinal section through a part of one of the side borders of the bridge-plate showing the mechanism which links the wheel-carrying arms together.

FIGURE 1 shows a bridge-plate 11 consisting of a flat sheet of metal of an area large enough to accommodate a trolley. The sides of the plate are bent to form inverted channel-shaped stiffening members 12, 13 extending from end to end and standing up above the level of the main part of the plate 11. Transversely, it is stiffened by shallow sheet metal box members 14 (FIGURE 5) welded to its underside and by end flanges 15.

In the centre of the underside of each of the channel-shaped stiffening members 12, 13 there is secured a bracket 16 which is U-shaped in cross-section and fits the interior of the stiffening member. In this bracket are pivots 17, 18 which extend from side to side for two wheel-bearing arms 19, 20. One arm 20 extends from each bracket toward the rear of the bridge-plate and the other arm 19 toward the front. The arms are themselves of inverted channel-shaped section and the arm 19 which extends toward the front is forked to receive a ground wheel 21. The arm 20 which extends toward the rear has pivoted at 22 on its outer end, just outside the end of the stiffening member, 12 or 13 as the case may be, a knee-shaped bracket 23 which rises and extends rearwardly and carries a castor mounting 24 for a second ground wheel 25.

Below each of the arms 20 there is pivoted at 30 between the sides of the two brackets 16 a link 31 which extends in a direction parallel to the arm 20 and is pivoted to the knee-shaped bracket 23 at 32. This ensures that the knee-shaped bracket 23 keeps the axis of the castor wheel mounting 24 vertical in all positions.

The two arms 19, 20 on each side are connected together by a link 26 which is seen in the detail FIGURE 6. The link 26 is pivoted to the arm 19 which extends forwardly at a position 28 which lies behind its pivot 17 to the bracket 16 and from this point the link 26 extends in an inclined direction downwardly to a pivot point 27 on the other arm 20 which is below the pivot 18 thereof. The effect is that when the rearwardly-extended arm 20 is swung downwardly the link 26 causes the forwardly-extending arm 19 to swing downwardly to approximately the same extent. Therefore, if the two pairs of links 19, 20, one on each side, are operated equally and at the same time, the bridge-plate 11 will rise from the ground and be maintained horizontal in so doing.

At the rear ends of the inverted channel-shaped stiffening members 12, 13 there are hollow box-shaped posts 33, 34 in which are located hydraulic rams 36, working in inverted cylinders 35. Each cylinder 35 is connected to the swinging arm 20 below it by a pivot 37 and the ram 36 to the top of the post, 33 or 34, by a pivot 38. Therefore, by operating the rams the bridge-plate 11 can be raised and lowered.

Furthermore, the forwardly-extending swinging arm 19 which is located in the side member 12 of the bridge-plate 11, carries a brake shoe 40, located in the base of the fork-shaped connection to the forward ground wheel 21 on that side of the truck. The brake shoe 40 is mounted on a push rod 41 which slides in guides 42, 43 provided in the swinging arm 19 and the push rod is spring-urged by spring 44 to bring the brake shoe 40 into contact with the ground wheel. A brake release cable 45 extends from a lever 46, pivotally mounted on a shaft 146 in a bracket 47 carried by arm 19 and connected by a link 48 to the push rod 41, to a point 49 close to the pivot 17 of the swinging arm. The cable 45 here passes round a pulley 50 on arm 19 and thence round a pulley 51 on a bracket 52 attached to bracket 16 and along the stiffening member 13 and up the inside of the box member 34 to an operating lever 52 pivoted thereon. The result is that operating the lever 52 will pull off the brake-shoe 40. It will be observed that the brake-shoe 40 is a fork-shaped member which grips the sides of the tyre of the wheel 21. A second similar brake mechanism is mounted on the arm 19 which is pivoted to the stiffening member 12 of the truck and it is mounted on the other end of the shaft 146 so that operation of the lever 52 causes both the brakes to be applied or released. Appropriate cable adjusters are provided as shown at 53, FIGURE 6.

Behind each of the two upstanding box-shaped posts 33, 34 which house the hydraulic rams 36, and at about the middle of their height, there is hinged a handle 54 (FIGURE 1) for pushing the truck. These handles are hinged on hubs 55 mounted on base-plates 57. The hubs of the handles carry locking pins 56 which are adapted to drop into locking holes in the base-plates 57 and when the pins are in the bases the handles are locked to the posts. They can be locked either in a downwardly-extending position as shown in FIGURE 1 so as to be out of the way, or in horizontal position as shown in chain lines. When in the latter position the bridge-plate 11 on its wheels 21, 25 can be pushed about by the handles. Two small ramps 58, 59 are welded on to the bridge-plate 11 at a spacing which corresponds with the track width of the wheels of a trolley. Thus, when the bridge-plate is lowered to the ground the ramps 58, 59 will enable the wheels of such a trolley to ride easily on to the bridge-plate. The handles 54 will for this purpose be lowered to the full-line position shown in FIGURE 1 and will offer no obstruction to the trolley being moved on to the bridge-plate.

To prevent the trolley running off the bridge-plate 11 backwards, stop plates 60 are provided which are lifted automatically as soon as the bridge-plate 11 begins to rise from the ground. To prevent it running off at the other end when it is pushed on to the bridge-plate there are stop plates 61 which are automatically lifted when the bridge-plate is lowered to the ground. Thus, if the bridge-plate is lowered as shown in FIGURE 2 so that a trolley may be pushed on to it over the ramps 58, 59, the stop plates 61 will be raised. To this end they are pivoted to the bridge-plate at 62 and they have side wing members 63 which engage the ground when the bridge-plate is lowered and lift the stops.

The rear stops 60 are shown in detail in FIGURE 5. Each comprises a plate with downwardly extending flanges 64 which are pivoted to the bridge-plate on a pivot pin 65. On another pivot pin 66 beneath the bridge-plate there are hinged lifting levers 67, two levers for each stop plate 60. The two levers 67 are rigidly connected together by cross members 68, 69 and their upper ends are rounded as shown at 70 to engage the underside of the stop plates 60. A spring 71 which is coiled round the pivot pin 66 has arms, one of which engages underneath the bridge-plate as shown at 72 and the other of which engages the cross-member 68 and tends to lift the levers. A cross-member 73 beneath the stop plate 60 engages the cross-member 68 and prevents it from moving too far. Therefore the natural position of the parts is that shown in FIGURE 5 but when the bridge-plate is lowered to the ground the tail ends of the levers 67 engage the ground so that the levers are folded down against the action of the spring 71 and the stop plates 60 are thereby allowed to fall into a horizontal position in which they are flush with the surface of the bridge-plate 11. In this way the stop members 60 do not oppose the wheeling of a trolley on to the bridge-plate but as soon as the bridge-plate begins to be raised the stop members 60 rise and prevent the trolley running off backwards.

To operate the hydraulic rams 36 a box 75 is mounted on the lateral stiffening member 13 of the bridge-plate just in front of the post 34 which contains the ram on that side. In the box 75 is an electric battery for operating a motor which drives a hydraulic pump. Hydraulic connections extend from the pump to the rams 36 and push-buttons are provided on the top of the adjacent posts 34, one for raising the bridge-plate and the other for lowering it.

At the front end of the bridge-plate 11 there is a hinged ramp 76 in the form of a metal plate which can be used as a flap to facilitate running trolleys off the bridge-plate on to the floor of a van such as the van 77 shown in chain line in FIGURE 4. When the flap 76 is not in use for this pupose it can be drawn upwards into the chain line position shown in FIGURE 1, where it will prevent the trolley accidentally running off the bridge-plate when the stops 61 are lowered. Any desired device may be used to hold the plate 76 in raised position. In some cases the plate 76 forming the ramp can be divided into three sections comprising a large rectangular centre portion and a narrow portion on each side of the centre section. Thus, when is is desired to lower the ramp to enter the doorway of a van, the appropriate section or sections of the ramp need only be used, depending on the size of the doorway. Alternatively, the plate may be formed in two or more sections which can slide transversely one over the other to vary the width.

Thus, in use, the bridge-plate 11 can be lowered to the level of the platform, the handles 54 can be lowered and a trolley run on. Then the handles can be lifted, the bridge-plate raised to any desired level within the capacity of the side arms 19, 20 and the bridge-plate moved by pressing on the handles 54 to carry the trolley to a railway van at the side of a platform or to a lorry backed against the other side of the platform, or otherwise as may be desired. The hinged plate 76 which forms a ramp for connection to the floor of the van or lorry is then hinged down and the trolley can be wheeled off with its load into the van. In unloading, the operations are reversed.

In a modified form one of the castor wheels 25 can be replaced by a somewhat larger fitting which contains a turntable mounting for a motor-driven ground wheel and the operator can thereby be saved from the labour of pushing the trolley about. In this case another box, similar to the box 75, which houses the battery and motor for raising and lowering the bridge-plate will be mounted on the other stiffening member 12 and this battery will be used for supplying power to the motor which drives the ground wheel.

I claim:

1. A device for facilitating transfer of goods comprising in combination a bridge-plate, wheel-carrying members supporting the bridge-plate and adjustable for height relatively thereto, ground-wheels on said members, a ramp pivoted at one edge to one end of the bridge-plate, stop means on the bridge-plate at the end by said pivoted ramp, said stop means being movable up and down an inoperative horizontal position relatively to the bridge plate and an operative position standing up therefrom, and means to lower the stop means to the inoperative position when the bridge plate is lowered to the ground.

2. A bridge-plate device as claimed in claim 1 wherein the wheels at one end are on castor mountings.

3. A bridge-plate device as claimed in claim 1 wherein handle means are provided at one end of the truck controlling its movement and are so mounted that when not in use they can be folded out of the way.

4. A bridge-plate device as claimed in claim 1, wherein there is also provided a second ramp hinged at the opposite end of the bridge-plate from the first ramp.

5. A device for facilitating transfer of goods comprising in combination a bridge plate, brackets beneath the plate near the centre of two parallel sides thereof, pairs of wheel-carrying members pivoted to the brackets at each side, the members of each pair extending away from one another along the side towards its ends, wheels on the wheel-carrying members, means interlinking the members of each pair so that they swing up and down in unison, means to swing the wheel-carrying members, a ramp hinged to the plate along one end thereof, stops near the other end of the plate and means to move the stops up when the plate is lowered and to lower the stop to one inoperative position when the plate is raised.

6. A bridge-plate device as claimed in claim 5 wherein the means to swing the wheel-carrying members comprise hydraulically-actuated means and wherein on the plate means are provided to supply liquid under pressure to said hydraulically actuated means.

7. A bridge-plate device as claimed in claim 5 wherein additional stops are provided which are located near the ramp and comprise members hinged in apertures in the plate so that they can fold down flat, levers for lifting the stops which have tail ends to engage the ground when the plate is lowered and to allow the stops to fold down, and springs for raising the levers when the tail ends are out of contact with the ground.

8. A bridge-plate device as claimed in claim 5 wherein the stop members comprise hinged flaps and the means to move the stops up comprise projections below the flaps to engage the ground and raise the flaps when the plate is lowered.

References Cited by the Examiner
UNITED STATES PATENTS

| | | | |
|---|---|---|---|
| 1,936,107 | 11/1933 | Cunneen | 187—8.52 |
| 1,941,301 | 12/1933 | Hanson et al. | 254—126 |
| 2,098,376 | 11/1937 | Cunneen | 187—8.52 |
| 2,597,213 | 5/1952 | Whiteman | 280—43.11 X |
| 2,792,079 | 5/1957 | Gibson | 214—512 X |
| 3,054,519 | 9/1962 | Fleming | 214—512 |
| 3,153,544 | 10/1964 | Jung et al. | 214—512 X |

GERALD M. FORLENZA, *Primary Examiner.*

A. J. MAKAY, *Assistant Examiner.*